April 17, 1956　　M. Q. BRUNTON　　2,742,157
SELF-CLEANING FILTER
Filed Jan. 10, 1952　　2 Sheets-Sheet 2
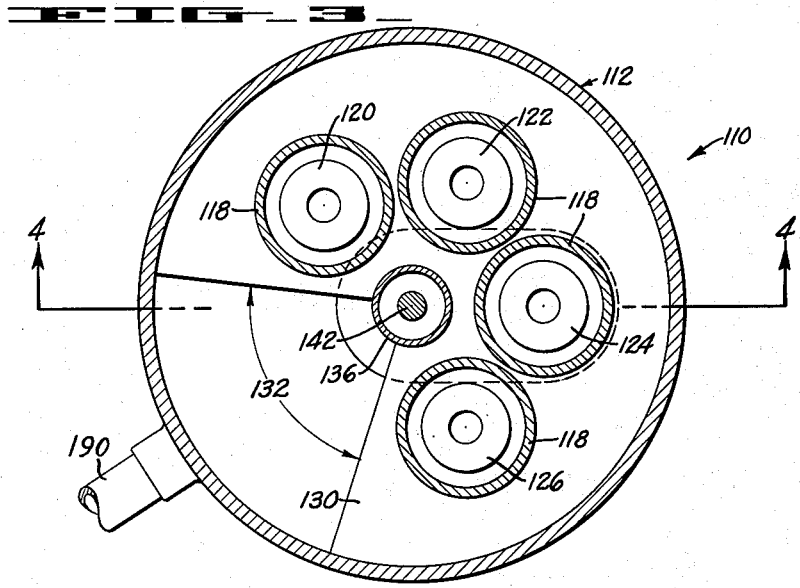
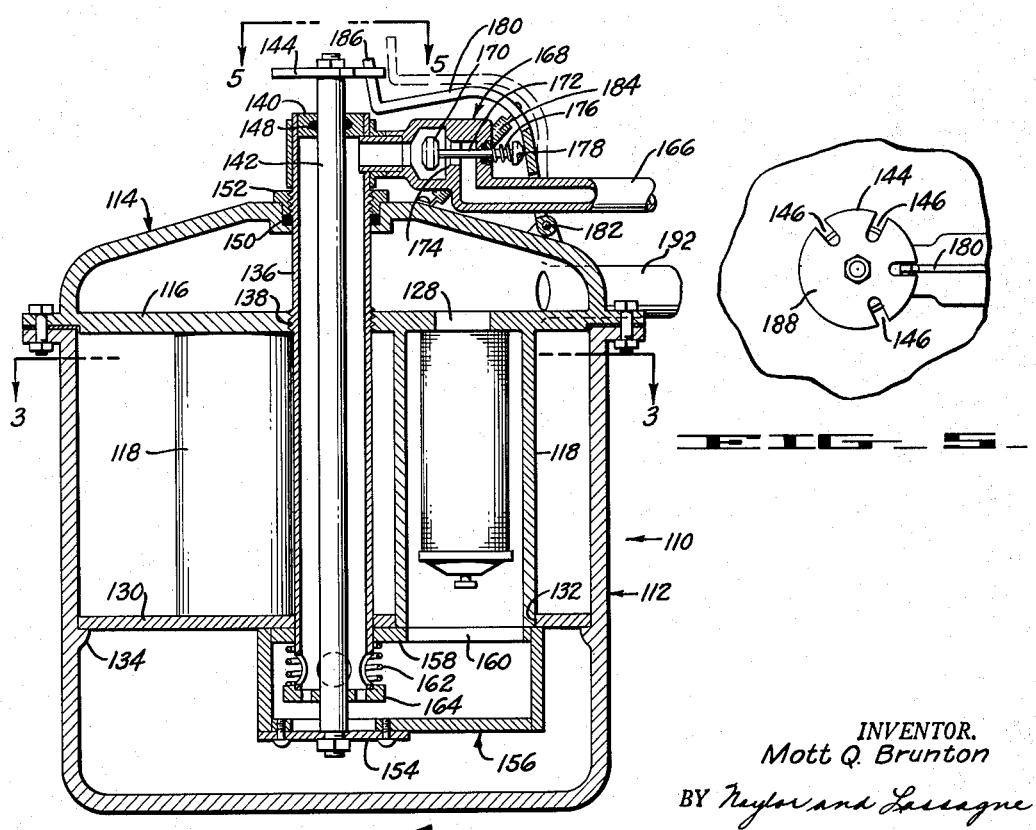
INVENTOR.
Mott Q. Brunton
BY Naylor and Lassagne
ATTORNEYS.

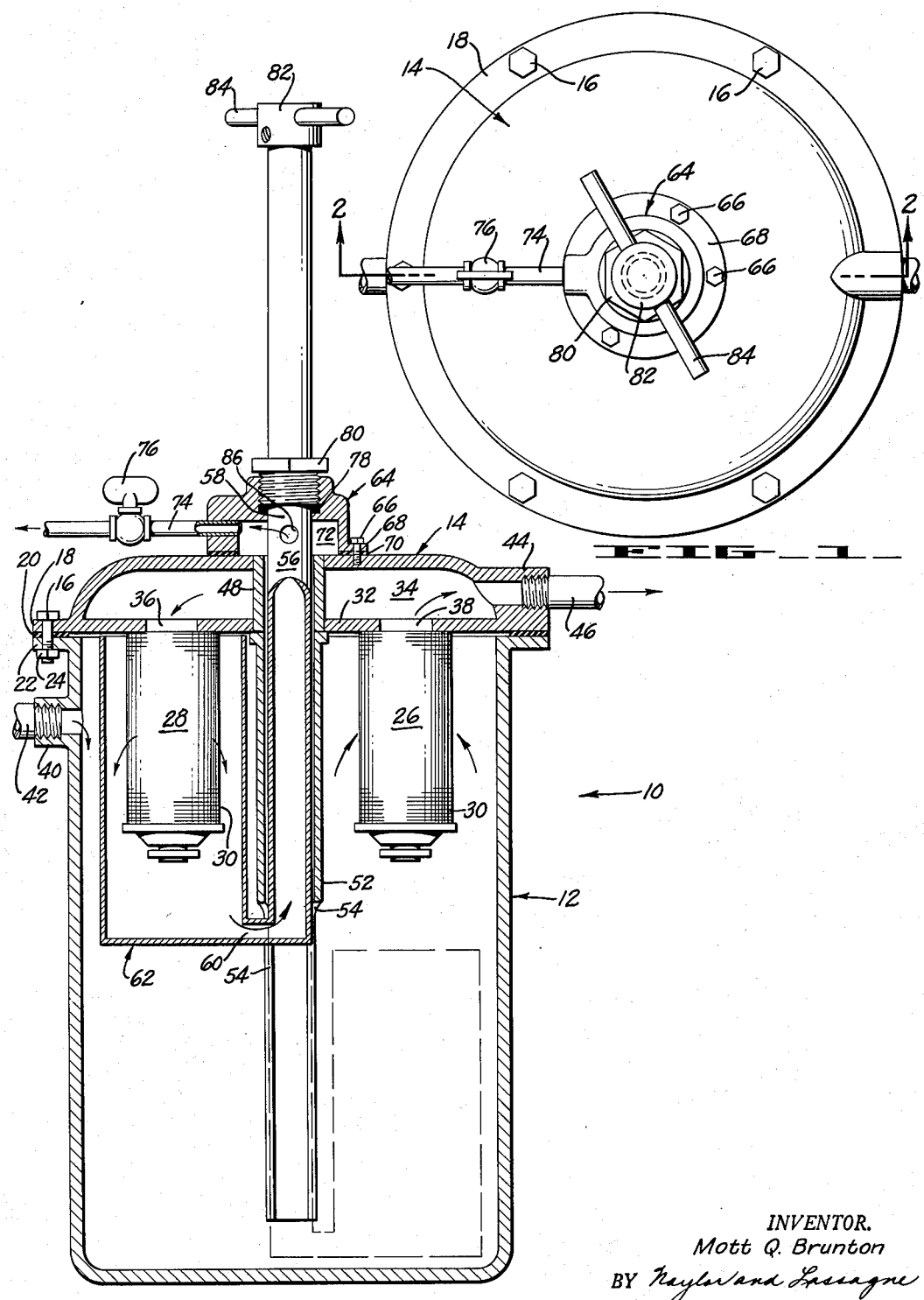

United States Patent Office 2,742,157
Patented Apr. 17, 1956

2,742,157
SELF-CLEANING FILTER
Mott Q. Brunton, San Francisco, Calif.

Application January 10, 1952, Serial No. 265,820

3 Claims. (Cl. 210—152)

This invention relates to filters, and more particularly to the embodiment in high-pressure filters of new and improved means for selectively cleaning any one of a group of filter elements without discontinuing operation of the filter.

An object of the invention is the provision of a multi-element filter having fluid flow control means adapted to cause a portion of the fluid passing through the filter to be reversely passed through a selected filter element to thereby cleanse the element.

A further object of the invention is the provision of a multi-element filter having an inlet line, a primary discharge line, a secondary discharge line or flow passageway, and fluid flow control means selectively operable to receive a portion of the fluid which would normally pass through the primary discharge line and divert this fluid in a reverse direction through a selected filter element and into the secondary discharge line.

Other objects and advantages of the invention will be apparent from the following description taken in conjunction with the drawings forming part of this specification, and in which:

Figure 1 is a top plan view of a multi-element filter embodying the self-cleaning system of the invention;

Figure 2 is a view in section taken along lines 2—2 of Figure 1;

Figure 3 is a view in section taken along lines 3—3 of Figure 4;

Figure 4 is a view in section taken along lines 4—4 of Figure 3; and

Figure 5 is a detail view taken along lines 5—5 of Figure 4.

Referring to the embodiment of the invention illustrated in Figures 1 and 2, a high-pressure large capacity filter indicated generally at 10 is comprised of a cylindrical filter body 12 and a filter head 14 secured to the body by bolts 16 extending through head flange 18, gasket 20, and body flange 22, said bolts being secured by nuts 24. A pair of filter elements 26 and 28, of the edge-type and comprised of a number of discs 30 having thicknesses which control the degree of filtration obtained, are carried by the bottom wall 32 of head 14 in discharge relation to head chamber 34 through ports 36 and 38. The body 12 is provided with an inlet nipple 40 having threadably engaged therewith an inlet line 42, while the head 14 is provided with an outlet nipple 44 having threadably engaged therewith an outlet line 46.

Normally, the bottom wall 32 of head 14 is imperforate except for the provision of the filter element ports 36 and 38, and the upper wall of the head is also imperforated except for the provision of the discharge outlet. As so constituted, fluid to be filtered is introduced into the body through inlet line 42, and the fluid then passes through the edge-type filter elements 26 and 28 and through the ports 36 and 38 to the head chamber 34, from whence it passes in filtered condition through the discharge line 46. The filter elements 26 and 28 eventually become clogged with dirt, or other foreign matter, which lodges between the discs 30 at the outer edges of the discs, thereby reducing the capacity and efficiency of the elements. When this condition occurs, conventional practice is to back-flush fluid through the filter elements by using line 46 as an input line and line 42 as an output line, or by removing the filter elements 26 and 28 from the head and separately cleaning them. In order to back-flush the filter it must be removed from its normal pipeline environment and this of course means that the filter will be out of use for the period required to remove it from the system, back-flush it, and replace it in the system. The present invention concerns the addition of means to the filter whereby the filter elements may be cleaned while the filter is still being used, and the added means for this purpose will now be described.

The head 14 is provided with an axially disposed sleeve, and secured to the head, as by bolts 50, is an elongated tube 52 serving as an extension of sleeve 48. The tube 52 is provided with diametrally opposed slots 54 in the lower end thereof for a purpose hereinafter described. Slidably disposed in fluid-tight fitting relation within sleeve 48 and tube 52 is a rod 56 which is hollow, or tubular, below the point indicated at 58. The lower end of the tubular portion of member 56 is closed off by an elbow extension 60 which is integral with a cylindrical cup 62 having an open upper end.

A housing 64 is secured to head 14 by bolts 66 extending through housing flange 68 and gasket 70 into the head. A discharge chamber 72 is defined within the housing 64, and a secondary fluid discharge line 74 is secured to the housing in communicating relation with chamber 72. The line 74 is provided with a control valve 76. A packing gland 78 carried within a recess formed in the upper end of housing 64 is securing in place by packing gland nut 80. The rod-like member 56 is provided with a boss 82 at its upper end and a cross handle 84 extends through the boss.

When the filter is in normal use, the boss 82 rests on the packing gland nut 80 so that the cup 62 is disposed at the bottom of the filter body 12, as indicated by the dotted outline showing of the cup, and when the cup is in this position the elbow extension 60 is disposed below the lower end of tube 54.

Assuming now that the filter elements 26 and 28 have become clogged with dirt, as best indicated by a drop in pressure measured by pressure gauges, not shown, located in the inlet and outlet lines 42 and 46, and that it is desired to first effect the cleaning of filter element 28, the cross handle 84 is manually rotated to turn the rod-like member 56 to a position where the elbow extension 60 thereof is in alignment with the left hand slot 54 of tube 52. The cup 62 will then be in axial alignment with filter element 28. The handle 84 is then lifted to raise member 56 and bring cup 62 into embracing relation with filter element 28 and to bring the upper edge of the cup into contact with the bottom wall 32 of head 14.

When this has been done, the fluid to be filtered, the flow of which into the filter body has not been interrupted by the operation described, is prevented from flowing in a filtering direction through element 28. The fluid passes through element 26 and into head chamber 34 where the back pressure will be such as to cause a diversion of flow of a portion of the fluid through port 36 and downwardly through filter element 28 to force the dirt outwardly from between the discs 30. The fluid and accumulated dirt passes to the bottom of the cup 62 and through the elbow extension 60 into the lower portion of member 56 constituting a discharge pipe, and the fluid flows upwardly through the pipe and passes out of a discharge aperture 86 in the pipe to chamber 72 and into the secondary discharge line 74 which is connected to a sump, not shown. When the fluid being discharged into the sump is clear of dirt, this will indicate that filter element 28 has been cleaned. Member 56 is then lowered to bring the cup 62 to the bottom of the filter body, and the cleaning procedure is then repeated with filter element 26.

A modified form of the self-cleaning filter system of the invention is shown in Figures 3–5. Here, the filter 110 is comprised of a filter body 112 and a filter head 114 secured thereto. Dependent from the bottom plate 116 of the head are a plurality of cylindrical skirts 118 open at their lower ends and laterally enclosing filter elements 120, 122, 124 and 126, each of the filter elements being associated with a discharge port, such as 128, providing for communication with the filter head chamber. A plate 130 having a segmental opening indicated at 132 in Figure 3 is supported within the body 112 on annular rib 134. The plate 130 is apertured to receive the lower open ends of the cylindrical skirts 118.

The filter is provided with a tube 136 extending through the head 114 and plate 130, said tube being fixedly positioned by threaded engagement at 138 with the bottom plate 116 of the head. The tube 136 is provided with a plug 140 at its upper end which serves as a bearing guide for rod 142 which has secured to its upper end a control wheel 144 having a plurality of spaced notches 146. A fluid sealing ring 148 is seated within the plug 140 in engagement with rod 142, and sealing means comprising a packing gland 150 and packing gland nut 152 provide a fluid-tight seal between head 114 and tube 136.

The rod 142 has a disc 154 fixedly secured to its lower end, and the disc in turn is fixedly secured to a box-like control member indicated generally at 156. The upper wall 158 of member 156 is in sleeved relation to tube 136, and wall 158 is provided with a circular aperture 160 which is radially alignable upon rotation of control rod 142 with any selected one of the cylindrical skirts 118. Compression spring 162 having one end in engagement with a seat ring 164 secured to the lower end of the fixed tube 136 and the other end in engagement with wall 158 of the box-like control member serves to maintain the upper wall 158 of member 156 in engagement with the lower edges of skirts 118 and the underside of plate 130, and the rod 142 which is fixedly secured to member 156 is thereby yieldingly maintained against downward endwise movement.

The filter system is provided with a secondary discharge line 166 which communicates through valve body 168 with the interior of tube 136. The valve disc 170 carried by stem 172 is normally maintained against valve seat 174 by compression spring 176 maintained on the stem between the valve housing and stem end 178. Control means for the automatic opening of the valve comprise the notched disc 144 and a lever 180 pivotally secured to filter head 114 at 182. Spring 184 connected at one end to the filter head and at the other end to the lever 180 urges the lever 180 in a counterclockwise direction to force vertically disposed arm 186 of the lever against disc 144. When the disc 144 is rotated so as to bring a notch 146 into alignment with lever arm 186, the lever 180 is pivoted by spring 184 to move arm 186 within the notch, and the pivotal movement of the lever 180 brings it into engagement with stem end 178 to overcome the spring 176 and move valve disc 170 away from seat 174.

When the disc 144 is in a position where lever arm 186 engages the major unnotched portion 188 of disc 144, the box-like control member 156 extends below the segmental openings 132 of plate 130 out of fluid flow blocking relation to any of the filter elements. When the control member is in this position, the filter system is in condition for normal operation, and the path of flow of the fluid to be filtered is as follows: through input line 190 and segmental opening 132 to the bottom of the filter body; upwardly through the open ends of cylindrical skirts 118; through the filter elements 120, 122, 124 and 126 and the discharge ports therefor, such as 128, and into the filter head; and through the primary discharge line 192.

When it is desired to clean the filter elements, the disc 144 is rotated to a point where lever arm 186 is forced by spring 184 into a notch 146, thus opening valve 168. This rotation of disc 144 causes rod 142 to be rotated to bring the box-like control member 156 into a position where the aperture 160 thereof is aligned with the lower end of one of the cylindrical skirts 118. Flow of fluid to the particular filter element within this skirt will then be blocked by member 156, and the back pressure of the fluid within the filter head received from the unblocked filter elements serves to force some of the fluid downwardly through the discharge port of the filter element with which the box-like control member 156 is associated. The filter cleaning fluid together with the dirt which it removes from the filter element passes into the control member 156 and into and through the tube 136 to the open discharge line 166. When the fluid passing into the sump, not shown, from the discharge line 166 is free of dirt, the cleaning operation of the particular filter element can be stopped by manually pivoting lever 180 to bring lever arm 186 out of notch 146, and the disc 144 can then be turned to bring the next succeeding notch 146 into alignment with the lever arm to thus initiate the cleaning of the next succeeding filter element. In this manner, each of the filter elements can be cleaned in succeeding order.

From the foregoing description it will be clear that I have provided a novel self-cleaning filter system well adapted for the attainment of the objects above set forth, and while two specific embodiments of the invention have been shown and described, it is to be understood that all substantial equivalents of these embodiments are within the spirit and scope of the invention.

What is claimed is:

1. A self cleaning filter comprising a filter body having a fluid inlet line, a filter head having a fluid discharge line, a plurality of filter elements carried within said body in dependent relation to said head and adapted to discharge fluid into said head, a tubular conduit extending axially through said head and into said body and communicating at its outer end with a secondary discharge line, a plurality of open-ended cylindrical skirts depending from said head, each skirt being in surrounding and spaced relation to a filter element, with the longitudinal axes of the skirts being located equi-distantly from the axis of said tubular conduit, a rod extending axially through said conduit, a box-like fluid control member secured to the lower end of said rod, said member being disposed so that the upper side thereof is contactable with the lower edges of said cylindrical skirts, and said member having a laterally extending portion provided with an upper side aperture which is registrable with the mouth of any of said skirts upon selective rotation of said rod, said member and conduit being so associated that the interiors thereof are intercommunicating, whereby, when said aperture is registered with the mouth of a skirt, the flow of fluid from said body into said skirt is prevented and a back-pressure-induced flow of fluid from said head through the filter element in said skirt passes through said member into said conduit to said secondary discharge line.

2. A self cleaning filter as set forth in claim 1, said rod being provided at its upper end with a handle for rotating said rod to position said member, said handle having associated therewith means for indicating the position of said member with respect to the mouths of said skirts.

3. A self cleaning filter as set forth in claim 1, said rod being provided at its upper end with a handle wheel, a lever pivotally secured at one end to said head and having its free end biased into engagement with the periphery of said handle wheel, a plurality of circumferentially spaced peripheral notches so related in number and angular spacing to said skirts and so related to the disposition of said member on said rod that when the free end of said lever is in registry with one of said notches the aperture of said member is in registry with the mouth of a predetermined one of said skirts, a valve in said secondary discharge line under the control of said lever, said lever being operable to open said valve when the free end of the lever is moved into a notch and being operable to close said valve when the free end is moved out of the notch.

References Cited in the file of this patent

UNITED STATES PATENTS

| | | |
|---|---|---|
| Re. 23,469 | Zollinger | Mar. 4, 1952 |
| 236,496 | Howes | Jan. 11, 1881 |
| 1,140,459 | Holt | May 25, 1915 |
| 1,819,602 | Hughes | Aug. 18, 1931 |
| 2,068,468 | Phillips | Jan. 19, 1937 |
| 2,095,447 | Lentz | Oct. 12, 1937 |
| 2,134,385 | Winslow | Oct. 25, 1938 |
| 2,173,060 | Andrews | Sept. 12, 1939 |
| 2,333,609 | Widmann | Nov. 2, 1943 |

FOREIGN PATENTS

| | | |
|---|---|---|
| 367,358 | Great Britain | Feb. 17, 1932 |